United States Patent
Hanson

(10) Patent No.: US 10,591,042 B2
(45) Date of Patent: Mar. 17, 2020

(54) DAMPER PULLEY

(71) Applicant: GM GLOBAL TECHNOLOGY OPERATIONS LLC, Detroit, MI (US)

(72) Inventor: Jeffery L Hanson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 215 days.

(21) Appl. No.: 15/662,835

(22) Filed: Jul. 28, 2017

(65) Prior Publication Data
US 2019/0032766 A1 Jan. 31, 2019

(51) Int. Cl.
| | | |
|---|---|---|
| F16H 55/36 | (2006.01) | |
| F02F 7/00 | (2006.01) | |
| F16F 15/129 | (2006.01) | |
| F16F 15/12 | (2006.01) | |
| F02B 67/06 | (2006.01) | |

(52) U.S. Cl.
CPC ............ *F16H 55/36* (2013.01); *F02B 67/06* (2013.01); *F02F 7/0043* (2013.01); *F16F 15/1201* (2013.01); *F16F 15/129* (2013.01); *F16H 2055/366* (2013.01)

(58) Field of Classification Search
CPC .... F16H 55/36; F16H 2055/366; F02B 67/06; F16C 13/006; F16C 2361/63
USPC ........................................................ 474/166
See application file for complete search history.

(56) References Cited

U.S. PATENT DOCUMENTS

| | | | | |
|---|---|---|---|---|
| 4,425,105 A | * | 1/1984 | Edl ........................... | F16P 1/02 474/140 |
| 5,601,504 A | * | 2/1997 | Rocca ................... | F16C 13/006 474/144 |
| 5,988,015 A | * | 11/1999 | Riu ........................ | F16F 15/124 74/574.2 |
| 7,041,019 B2 | * | 5/2006 | Matsubara .......... | F04B 27/0895 474/199 |
| 8,419,574 B2 | * | 4/2013 | Serkh .................. | F16F 15/1216 474/94 |
| 8,820,503 B2 | * | 9/2014 | Schneider ............. | F16D 41/206 192/55.5 |
| 9,175,763 B2 | * | 11/2015 | Wolf ....................... | F16H 55/48 |
| 2007/0072714 A1 | * | 3/2007 | Filip ..................... | F16C 13/006 474/144 |
| 2009/0305828 A1 | * | 12/2009 | Rasche .................. | F02B 67/06 474/94 |
| 2011/0070987 A1 | * | 3/2011 | Swane ............. | B29C 45/14467 474/144 |
| 2011/0245000 A1 | * | 10/2011 | Serkh .................. | F16F 15/1216 474/94 |
| 2011/0256968 A1 | * | 10/2011 | Serkh ....................... | F16D 3/12 474/70 |

(Continued)

*Primary Examiner* — Henry Y Liu
(74) *Attorney, Agent, or Firm* — Cantor Colburn LLP

(57) ABSTRACT

A damper pulley assembly for a vehicle engine is provided wherein the damper pulley assembly includes a hub, a pulley and a hybrid shield affixed to the hub. The hub may be affixed to the crankshaft. The hub includes a pulley contact surface. The pulley may be mounted on the hub at the pulley contact surface of the hub. The hybrid shield may be affixed to the hub. The hybrid shield may be configured to attenuate an axial flow of noise and vibration from the crank shaft when the crankshaft, the hub, and the pulley are rotating.

18 Claims, 4 Drawing Sheets

(56) References Cited

U.S. PATENT DOCUMENTS

| | | | | |
|---|---|---|---|---|
| 2012/0149511 A1* | 6/2012 | Hodjat | F16D 3/10 474/94 |
| 2013/0090198 A1* | 4/2013 | Itoo | F16H 57/03 474/93 |
| 2014/0141892 A1* | 5/2014 | Williams | F16D 41/206 464/40 |
| 2014/0187366 A1* | 7/2014 | Kouma | F16H 57/031 474/8 |
| 2014/0194237 A1* | 7/2014 | Wolf | F16H 55/48 474/166 |
| 2014/0329629 A1* | 11/2014 | Vukojicic | F16H 55/36 474/94 |
| 2015/0192196 A1* | 7/2015 | Yamamoto | F16D 41/06 474/144 |
| 2015/0316137 A1* | 11/2015 | Lannutti | F16H 55/36 474/144 |
| 2015/0316138 A1* | 11/2015 | Dell | B60K 25/02 474/91 |
| 2016/0069418 A1* | 3/2016 | Schneider | F16F 15/1442 188/380 |
| 2016/0146328 A1* | 5/2016 | Dell | F16H 55/36 474/94 |
| 2016/0333511 A1* | 11/2016 | Spitler | C03B 37/083 |
| 2017/0298995 A1* | 10/2017 | Serkh | F16D 7/022 |
| 2018/0045287 A1* | 2/2018 | Imai | F16C 33/726 |
| 2018/0163788 A1* | 6/2018 | Dell | F02B 67/06 |
| 2018/0195483 A1* | 7/2018 | Serkh | F02N 11/0851 |
| 2018/0328414 A1* | 11/2018 | Kastner | F16D 3/52 |

* cited by examiner

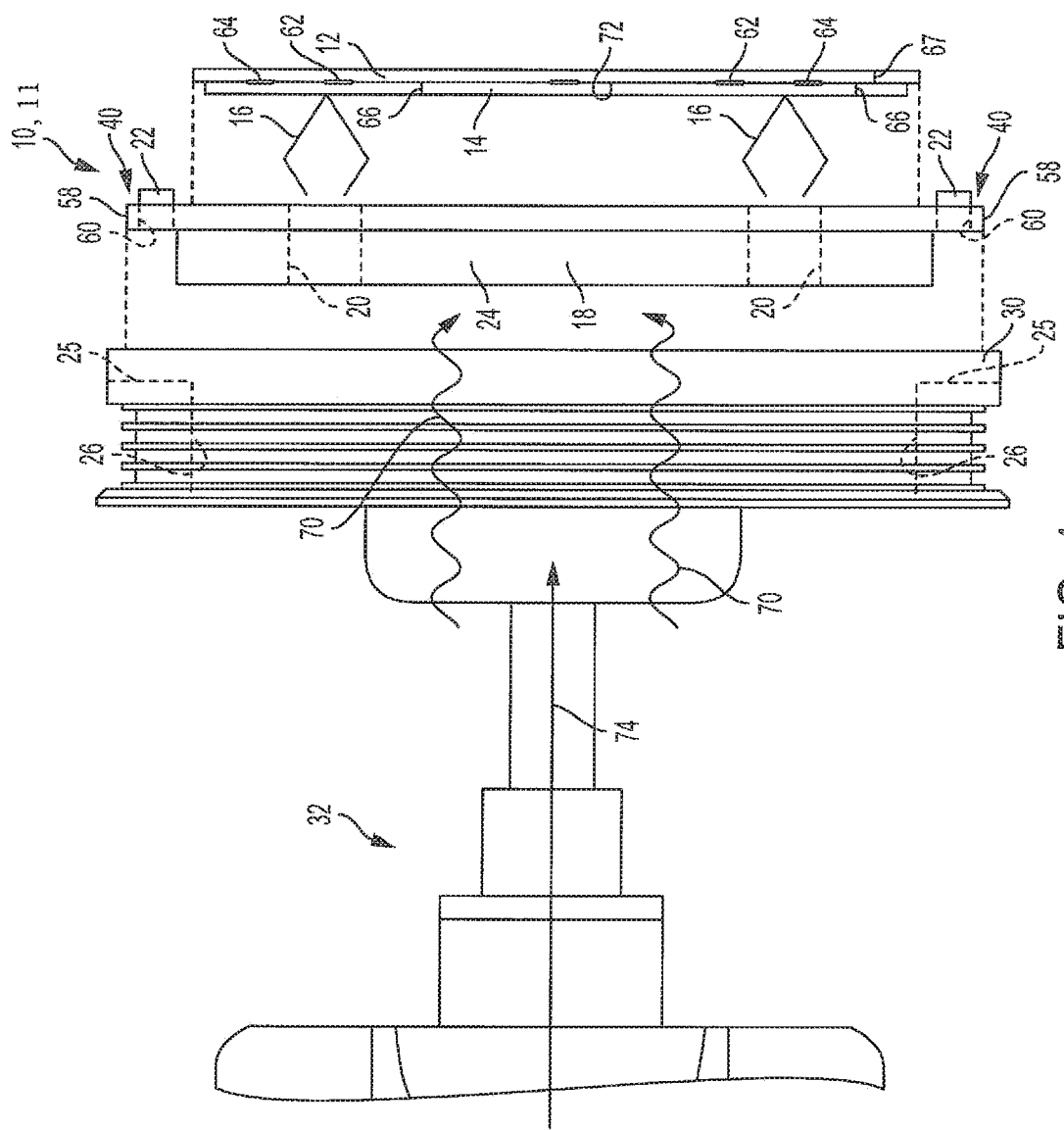
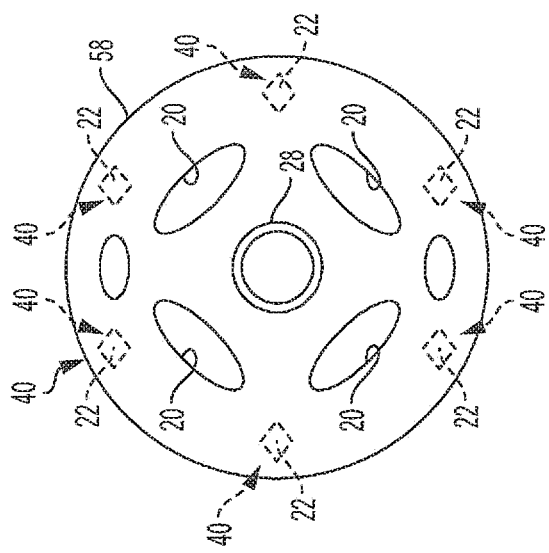
FIG. 3A
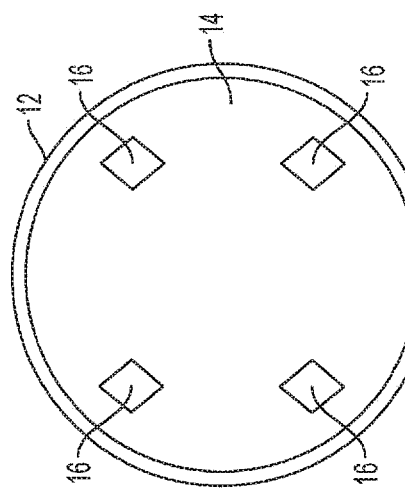
FIG. 3B
FIG. 4

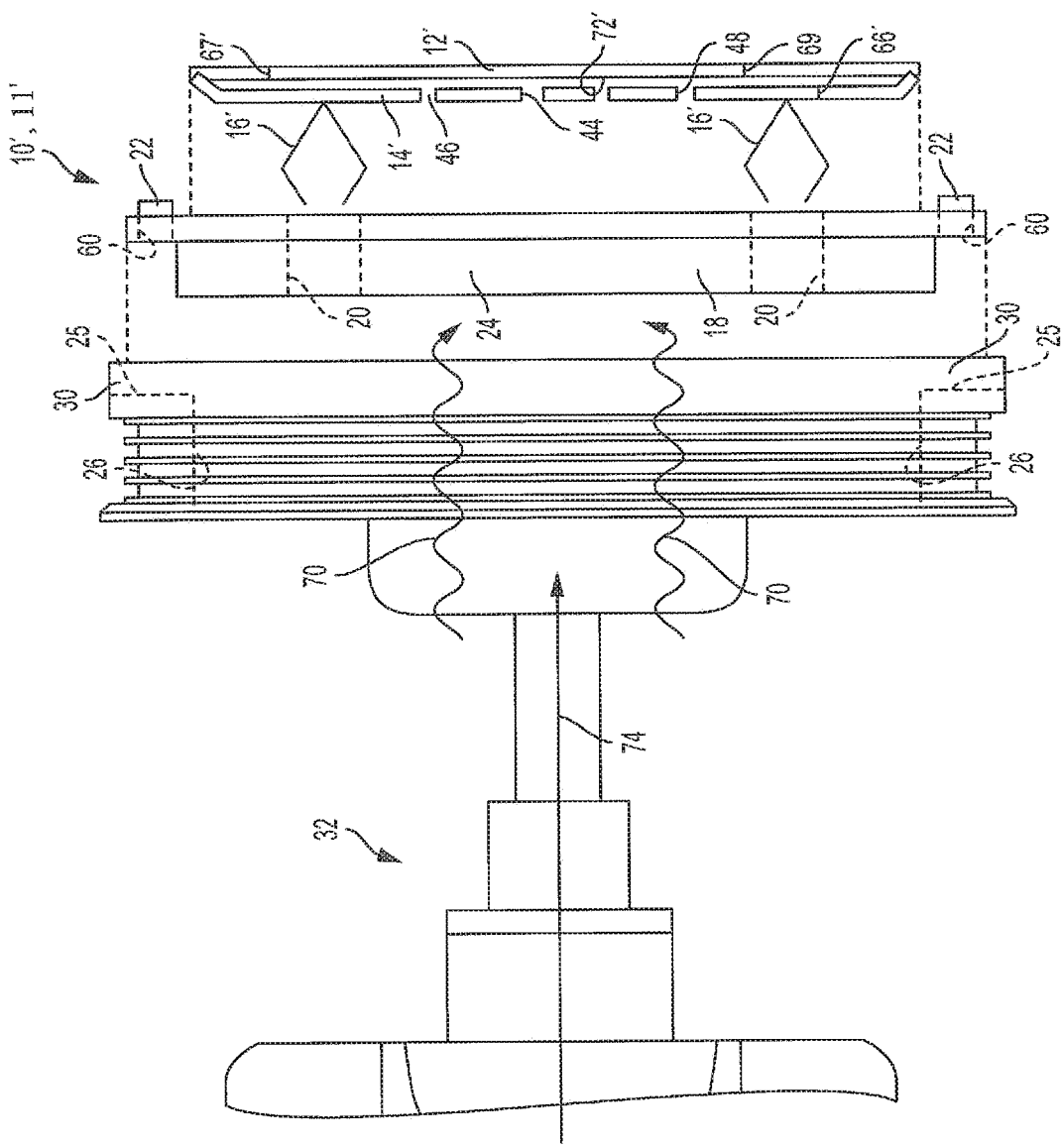
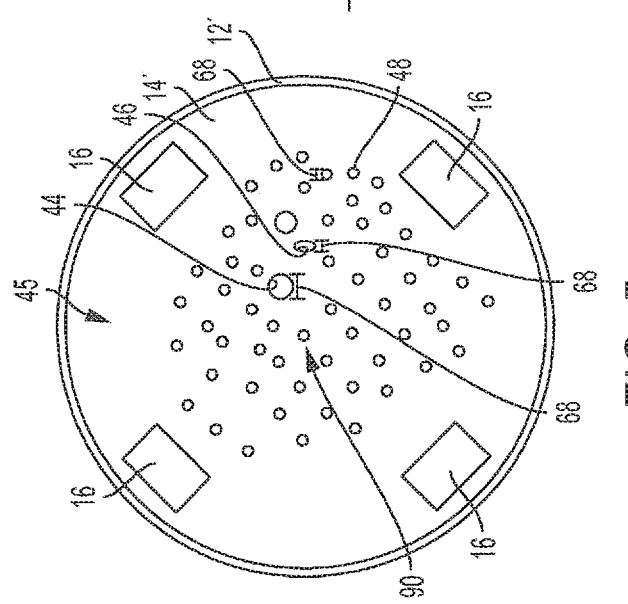
FIG. 6
FIG. 5

DAMPER PULLEY

TECHNICAL FIELD

The present disclosure relates to a camshaft assembly for a vehicle engine.

INTRODUCTION

In general, a damper pulley is directly fitted on a crankshaft and rotates with it to be able to directly receive torque from the crankshaft that are rotated by an engine. The damper pulley transmits the torque of the engine from the crankshaft to accessories such as a water pump, air compressor, power steering system, and air conditioner.

The damper pulley is formed by combining a hub, which is fitted on a crankshaft rotated by power from an engine and rotates with it, with a pulley, which rotates with the hub and is connected with belt. The hub and the pulley may be bolted. Vibration and noise may be generated in an axial direction from the rotating crankshaft. The vibration and noise may negatively affect the lifespan of the belt which transfers energy to other components and is connected to the pulley. Moreover, the vibration and noise may also cause undesirable engine noise for the vehicle user.

Accordingly, there is a need to address undesirable vibration and noise which emanates from the crankshaft in an axial direction. The information disclosed in this Background section is only for enhancement of understanding of the general background of the invention and should not be taken as an acknowledgement or any form of suggestion that this information forms the prior art already known to a person skilled in the art.

SUMMARY

A damper pulley assembly for a vehicle engine is provided wherein the damper pulley assembly includes a hub, a pulley and a hybrid shield affixed to the hub. The hub may be affixed to the crankshaft. The hub includes a pulley contact surface. The pulley may be mounted on the hub at the pulley contact surface of the hub. The hybrid shield may be affixed to the hub. The hybrid shield may be configured to attenuate an axial flow of noise and vibration from the crank shaft when the crankshaft, the hub, and the pulley are rotating.

In another embodiment a damper pulley assembly for a vehicle engine is provided wherein the damper pulley assembly includes a hub, a pulley, and a hybrid shield having a plurality of apertures. The hub may be affixed to a crankshaft. The hub may include a pulley contact surface. The pulley may be mounted on the hub at the pulley contact surface, and the hybrid shield may be affixed to the hub. The hybrid shield configured to attenuate an axial flow of noise and vibration via at least a plurality of apertures defined in the hybrid shield when the crankshaft, the hub, and the pulley are rotating.

In both embodiments above, the hybrid shield may be a multi-layered component having a cover and an insulating layer. The insulating layer may be configured to break up an axial flow of noise and vibration from the crankshaft. Where a plurality of apertures are defined in the insulating layer, the plurality of apertures are configured to break up the axial flow of noise and vibration. Alternatively, where the insulating material does not have apertures, the material properties of the insulating material may break up the axial flow of noise and vibration as the axial flow of noise and vibration travels through the insulating material.

In both embodiments, the cover may be configured to deflect and dissipate the axial flow of noise and vibration from the crankshaft. It is further understood that the cover may be more rigid than the insulating layer. The insulating layer, in the form of a lot fiberglass material, may be affixed to the cover, in the form of a polymeric material (ex: nylon), via at least one of an adhesive and a mechanical fastener. Alternatively, the insulating layer may be affixed to the cover by injection molding the insulating layer onto the cover via a dual shot injection mold process. Optionally, an air gap may be disposed between the cover and the insulating layer.

BRIEF DESCRIPTION OF THE DRAWINGS

FIG. 3A illustrates a front view of a non-limiting example hub for use in a pulley damper assembly of the present disclosure.

FIG. 3B illustrates a rear view of a non-limiting example hybrid shield formed by the cover and insulating layer for use in a pulley damper assembly of the present disclosure wherein the fasteners are schematically shown.

FIG. 4 illustrates an expanded top view of an example non-limiting pulley damper assembly and crankshaft in accordance with the present disclosure.

FIG. 5 illustrates a rear view of another non-limiting example hybrid shield formed by the cover and insulating layer for use in a pulley damper assembly of the present disclosure.

FIG. 6 illustrates an expanded top view of the example non-limiting pulley damper assembly of FIG. 5 wherein the pulley damper assembly would be mounted onto a crankshaft.

Like reference numerals refer to like parts throughout the description of several views of the drawings.

DETAILED DESCRIPTION

Figure 1:
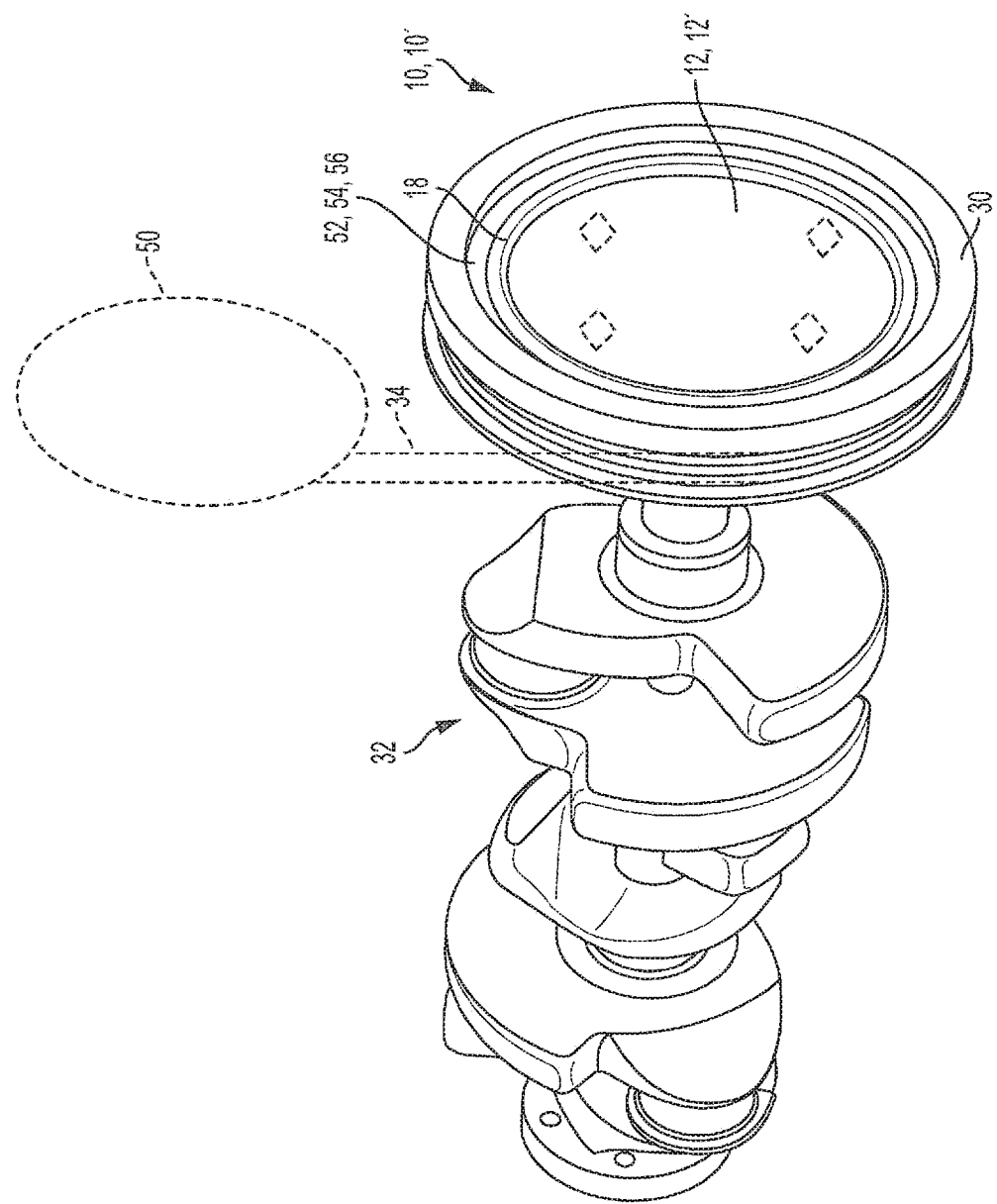
FIG. 1 illustrates an example, non-limiting pulley damper assembly in accordance with the present disclosure where the pulley damper assembly is mounted on a crankshaft.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any manner.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

The following detailed description is merely exemplary in nature and is not intended to limit the present disclosure or the application and uses of the present disclosure. Furthermore, there is no intention to be bound by any theory presented in the preceding background or the following detailed description.

For convenience in explanation and accurate definition in the appended claims, the terms "inner" or "outer", and etc. are used to describe features of the exemplary embodiments with reference to the positions of such features as displayed in the figures.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is an expanded perspective view showing a damper pulley assembly according to an exemplary embodiment of the present invention. As shown in FIG. 1, a damper pulley 10, 10' according to exemplary embodiments of the present invention includes a hub 18 and a pulley 30 which are mounted onto a crankshaft 32.

In this disclosure relating to a damper pulley assembly 10, 10', the combination and contact of the hub 18, hybrid shield 11, 11' (formed by at least the hub cover 12, 12', insulating layer 14, 14)', and the pulley 30 are described wherein crankshaft 32 is connected any one or more of a variety of accessories 50 which can be a water pump, air compressor, a power steering system, and an air conditioner via belt 34 and damper pulley assembly 10, 10'. The basic configurations of the hub 18; hybrid shield 11, 11' (formed by at least hub cover 12, 12'; insulating layer 14, 14'); and the pulley 30 of damper pulley assemblies 10, 10' are illustrated in the figures. It is understood that cover 12, 12' and the insulating layer 14, 14' respectively form a hybrid shield 11, 11'.

Referring now to FIGS. 3A and 4, a first embodiment of the present disclosure is shown. The hub 18 has a pulley contact surface 26 and pulley coupling regions 40. The pulley contact surface 26 is the surface of the hub 18 that is brought in contact with the pulley 30. The pulley contact surface 26 may be defined on any surface of the hub 18 depending on how the hub is disposed within the pulley. In the example of FIG. 4, the pulley contact surface is the outer circumferential surface. Thus, regardless, the pulley contact surface 26 is configured to be disposed adjacent to the hub contact surface 26 of pulley 30 when the hub 19 is installed onto the pulley 30 as shown in FIGS. 1 and 4. It should also be noted that intervening member 52 may optionally be implemented in the pulley damper assembly 10 wherein the intervening member 52 is a seal 54 or a washer 56. As shown in FIG. 1, intervening member 52 may be disposed between the pulley 30 and the hub 18. This, in the example of FIG. 1, intervening member 52 may, but not necessarily be specifically disposed between the pulley contact surface 24, 24' (FIGS. 1, 4 and 6) and the hub contact surface 26, 26' (FIGS. 1, 4, and 6).

With respect to the first embodiment shown in FIG. 4 as well as the second example embodiment shown in FIG. 6 of the present disclosure, the pulley coupling regions 40 of the hub 18 may be grooves recessed radially inward (not shown) from the outer circumference of the pulley contact surface 26, or as shown in FIGS. 3A, 4, and 6, the pulley coupling regions 40 may be apertures 60 defined proximate to the circumferential edge 58 (FIGS. 3A, 4 and 6) of the hub 18 wherein the apertures 60 are configured to receive a coupling member 22 such that a coupling member 22 couples the hub 18 to the pulley 30. Further, as shown in FIG. 3A, a plurality of pulley coupling regions 40 may be formed around and proximate to the circumferential edge 58 of the hub 18. Also, with respect to the pulley in the first embodiment of FIG. 4 as well as the pulley in the second embodiment of FIG. 6, the pulley 30 has a hub contact surface 26 and hub coupling portions 25. The hub contact surface 26 of the pulley may be a side/surface that is brought in contact with (and adjacent to) the pulley contact surface 24 of the hub 18 if an intervening member 52 (washer or seal) of FIG. 1 is not implemented in the pulley damper assembly 10, 10'.

Figure 2:
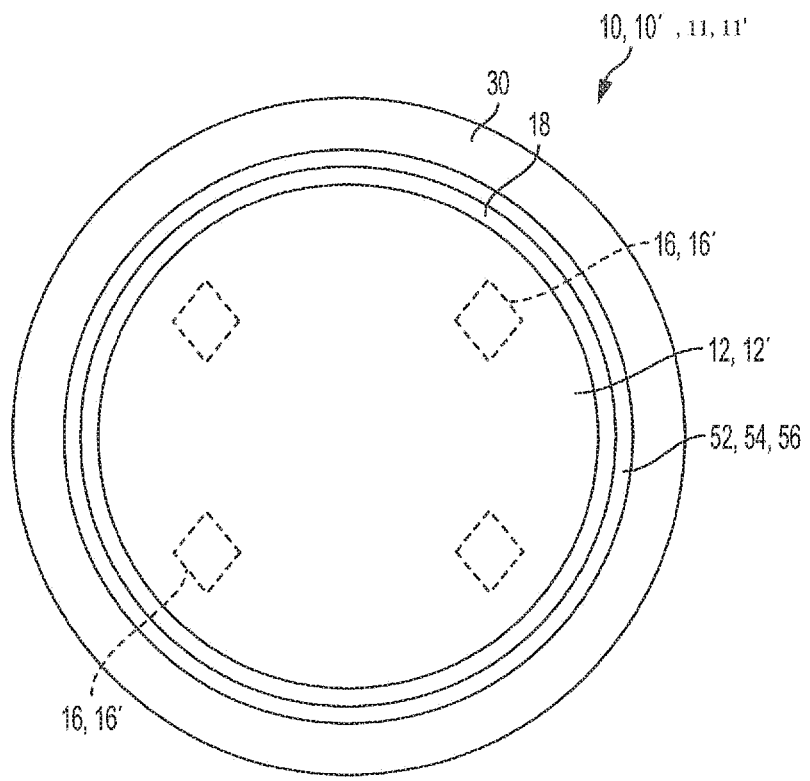
FIG. 2 illustrates a front view of a pulley damper assembly in accordance with the present disclosure.

The hub coupling portions 25 may be formed with regular intervals, corresponding to the positions of the pulley coupling regions 40 and the pulley coupling regions 40 are formed at least as many as the hub coupling portions 25. The hub 18 and the pulley 30 may be combined by securing the coupling members 22 into the hub coupling portions 25 and the pulley coupling regions 40 (see FIGS. 2A and 2B). Similar to the hub coupling portions 25, he pulley coupling regions 40 may be arranged with regular intervals along and proximate to the circumferential edge 58 of the hub 18. As shown in FIGS. 4 and 6—first embodiment and second embodiment respectively, the pulley coupling regions 40 may be proximate to the pulley contact surface 26. The hub 18 and the pulley 30 may be combined by securing the coupling members 22 through the hub 18 to the pulley 30 through the pulley coupling regions 40 (see FIGS. 3A, 4 and 6). The pulley coupling regions 40 may be formed in the shape of a groove recessed from the outer circumference of the hub 18. However, the pulley coupling regions 40 may also be in the form of the shape of a circular or substantially circular hole in the hub 18 through which the coupling members 22 are inserted. For example, the coupling members 22 may be bolts or rivets or other mechanical fastener.

It is understood that optional intervening member 52 may be made of an insulator. For example, the intervening member 52 may be made of plastic or rubber. Further, the intervening member 52 may be formed in the shape of a ring so that the coupling member 22 (shown in FIGS. 4 and 6 respectively) passes through it. Since the intervening member 52 may optionally be disposed between the pulley coupling regions 40 and the hub coupling portions 25, direct contact between the coupling portions 25 of the pulley 30 and the coupling members 22 may be prevented when optional intervening member 52 is included as part of the damper pulley assembly 10, 10'. The intervening member 52 between the pulley coupling regions 40 and the hub coupling portions 25 may be compressed by securing the coupling members 22, due to elastic deformation of the intervening member 52.

FIG. 4 is a top, expanded, non-limiting view of an example first embodiment of the damper pulley assembly as it is installed onto a crankshaft in accordance with the present disclosure. As shown, pulley damper assembly 10 includes hybrid shield 11 which includes at least the insulating layer 14 and cover 12. The insulating layer 14 may, but not necessarily, be continuous as shown in FIGS. 3B and 4. Insulating layer 14 may be disposed adjacent and directly onto cover 12 via an adhesive 62 (schematically shown as element 62 in FIG. 4). Insulating layer 14 may, but not necessarily, be formed from fiberglass loft wherein the insulating layer may have a thickness 66 which falls in the range of 2 mm to 10 mm. Adhesive 62 is an optional means to secure insulating layer 14 to cover 12. Adhesive 62 may be a continuous layer between the insulating layer 14 and cover 12 or adhesive 62 may be disposed in specific regions between the insulating layer 14 and the cover 12. In lieu of or in addition to the adhesive 62, a mechanical fastener 64 may be implemented to secure insulating layer 14 to cover 12. Insulating layer 14 may also be an injection molded composite having fiberglass wherein insulating layer 14 is injection molded onto cover 12 via a dual shot injection molding process. It is understood that cover 12 may be made from a polymeric material such as nylon wherein the cover 12 may be more rigid than the insulating layer 14. The cover 12 may have a thickness 67 which falls in the range of about 2 mm to about 5 mm.

It is understood, that in the first embodiment shown in FIGS. 3B and 4, insulating layer 14 and the cover 12 may be configured to break up noise and vibration 70 as the noise and vibration 70 passes through the insulating layer 14. The noise and vibration 70, after being broken up through the insulating layer 14 may then be reflected and dissipated by the inner cover surface 72 of the cover 12. Accordingly, the pulley damper assembly 10 is configured to attenuate noise and vibration 70 which emanates from the crank shaft in an axial direction 74 by breaking up the noise and vibration and then reflecting/dissipating the noise/vibration 70 via the inside surface 72 of cover 12.

With further reference to the first embodiment as shown in FIGS. 3B and 4, fasteners 16 may be fixed to the cover 12 and/or insulating layer 14 to secure the cover 12 and insulating layer 14 to the hub 18. Fasteners 16 may be configured to expand upon engagement with apertures 20 (FIG. 3A) on the hub 18 so that the cover 12 and insulating layer 14 remain affixed to the hub 18. Example fasteners 16 include but are not limited to spring clips for easy assembly. However, it is understood that fasteners 16 may be any form of a mechanical fastener.

With reference now to FIGS. 3A, 5, and 6, a second non-limiting example embodiment of the pulley damper assembly 10' is shown. The pulley damper assembly 10' includes an insulating layer 14' having a plurality of apertures 45, a cover 12', and pulley 30' and hub 18 as previously described. In the second embodiment, insulating layer 14' defines a plurality of apertures 45 which includes at least one of large sized apertures 44, medium sized apertures 46, and/or small sized apertures 48 wherein the pulley damper assembly 10' may adjust the tuning by implementing a certain number of apertures 45 of certain sizes. As shown in FIG. 5, the plurality of apertures 45 may be generally concentrated toward the central region 90 of the insulating layer 14'. The large sized apertures 44 may have a diameter 68 which falls in the range of about 2 mm to about 4 mm. The medium sized apertures 46 may have a diameter 68 which falls in the range of about 1.5 mm to about 2.5 mm. The small sized apertures 48 may have a diameter 68 which falls in the range of about 0.5 mm to about 1.5 mm. It is understood that cover 12' may be made from a polymeric material such as nylon wherein the cover 12' may be more rigid than the insulating layer 14' or cover 12' may be as rigid as the insulating layer. The cover 12' may have a thickness 67' which falls in the range of about 2 mm to about 5 mm.

Moreover, with respect to the second embodiment of the pulley damper assembly 10', insulating layer 14' is spaced apart from cover 12 with air gap 69 there between as shown in FIG. 6. The air gap 69 may have a width 71 which falls in a range of approximately 2 mm to approximately 6 mm. Insulating layer 14' may be formed from a polymeric material which is injection molded onto cover 12. Insulating layer 14' may or may not include fiberglass in the polymeric material. The air gap 69, insulating layer 14' and the cover 12 may be configured to break up noise and vibration 70 as the noise and vibration 70 passes through the plurality of apertures 45 and air gap 69. The noise and vibration 70, after being broken up through the plurality of apertures 58 may then be reflected and dissipated by the inner cover surface 72 of the cover 12. Accordingly, the pulley damper assembly 10' is configured to attenuate an axial flow 70 of noise and vibration which emanates from the crank shaft in an axial direction 74.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A damper pulley for a vehicle engine, the damper pulley assembly comprising:
    a hub affixed to a crankshaft, the hub cover having a pulley contact surface;
    a pulley mounted on the hub at the pulley contact surface; and
    a hybrid shield affixed to the hub, the hybrid shield including a cover, an insulating layer provided on the cover, and a plurality of expandable fasteners projecting axially outwardly of the insulating layer into the hub, wherein the hybrid shield is configured to attenuate an axial flow of noise and vibration from the crank shaft when the crankshaft, the hub, and the pulley are rotating.

2. The damper pulley assembly as defined in claim 1 wherein the hybrid shield is a multi-layered component.

3. The damper pulley assembly as defined in claim 1 wherein the insulating layer is configured to break up an axial flow of noise and vibration from the crankshaft.

4. The damper pulley assembly as defined in claim 1 wherein the cover is configured to deflect and dissipate the axial flow of noise and vibration from the crankshaft.

5. The damper pulley assembly as defined in claim 1 wherein the cover is more rigid than the insulating layer.

6. The damper pulley assembly as defined in claim 1 wherein an air gap is disposed between the cover and the insulating layer.

7. The damper pulley as defined in claim 1 wherein the insulating layer is affixed to the cover via at least one of an adhesive and a mechanical fastener.

8. The damper pulley assembly as defined in claim 1 wherein the insulating layer is injection molded onto the cover via a dual shot injection molding process.

9. The damper pulley assembly as defined in claim 1 wherein the insulating layer is formed from a loft fiberglass material and the cover is formed from nylon.

10. A damper pulley assembly for a vehicle engine, the damper pulley assembly comprising:
    a hub affixed to a crankshaft, the hub having a pulley contact surface;
    a pulley mounted on the hub at the pulley contact surface; and
    a hybrid shield affixed to the hub, the hybrid shield configured to attenuate an axial flow of noise and vibration via at least a plurality of apertures defined in the hybrid shield when the crankshaft, the hub, and the pulley are rotating.

11. The damper pulley assembly as defined in claim 10 wherein the hybrid shield is a multi-layered component.

12. The damper pulley assembly as defined in claim 10 wherein the hybrid shield includes a cover and an insulating layer.

13. The damper pulley assembly as defined in claim 12 wherein the plurality of apertures are defined in the insulating layer and are configured to break up the axial flow of noise and vibration from the crankshaft.

14. The damper pulley assembly as defined in claim 12 wherein the cover is configured to deflect and dissipate the axial flow of noise and vibration from the crankshaft.

15. The damper pulley assembly as defined in claim 14 wherein the cover is more rigid than the insulating layer.

16. The damper pulley assembly as defined in claim 10 wherein an air gap is disposed between the cover and the insulating layer.

17. The damper pulley as defined in claim 10 wherein the insulating layer is injection molded onto the cover via a dual shot injection molding process.

18. The damper pulley assembly as defined in claim 10 wherein the cover is more rigid than the insulating layer.

* * * * *